June 25, 1968 D. G. COWLIN 3,389,779
STORAGE CONVEYER
Filed Sept. 27, 1965 4 Sheets-Sheet 2
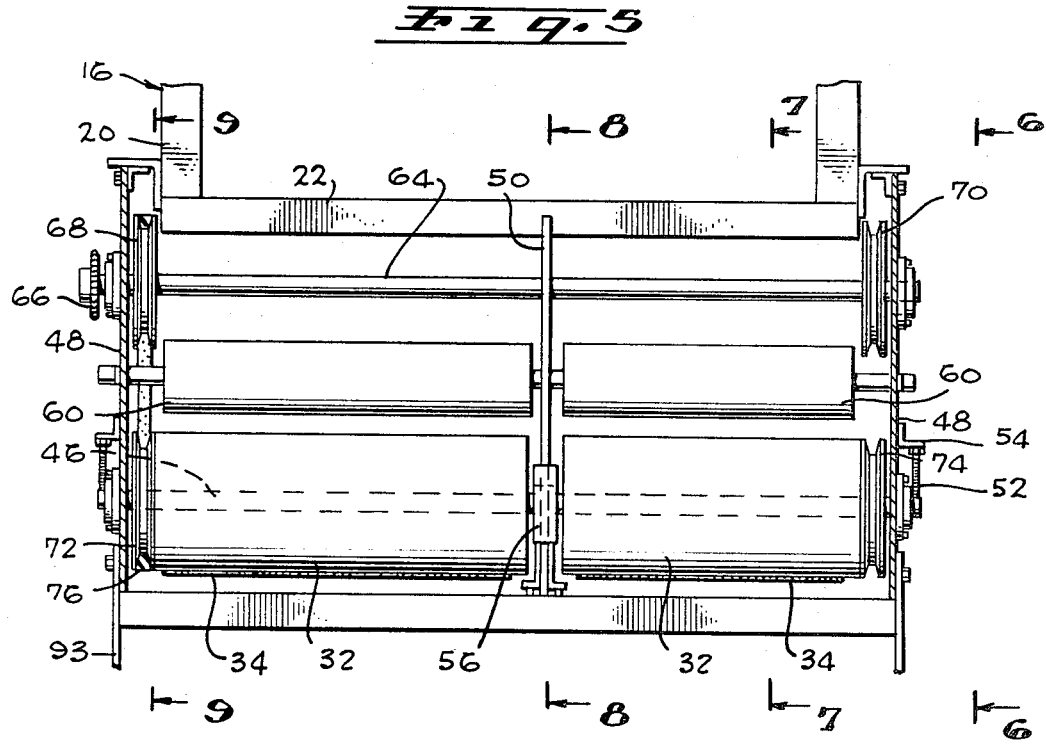
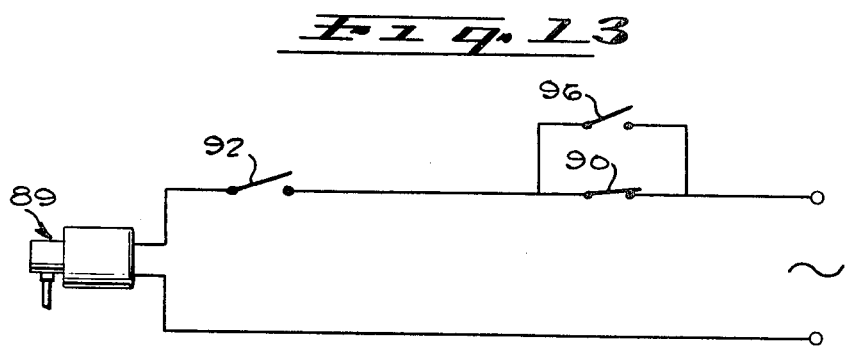
INVENTOR.
DONALD G. COWLIN
BY
Beehler & Arant
ATTORNEYS

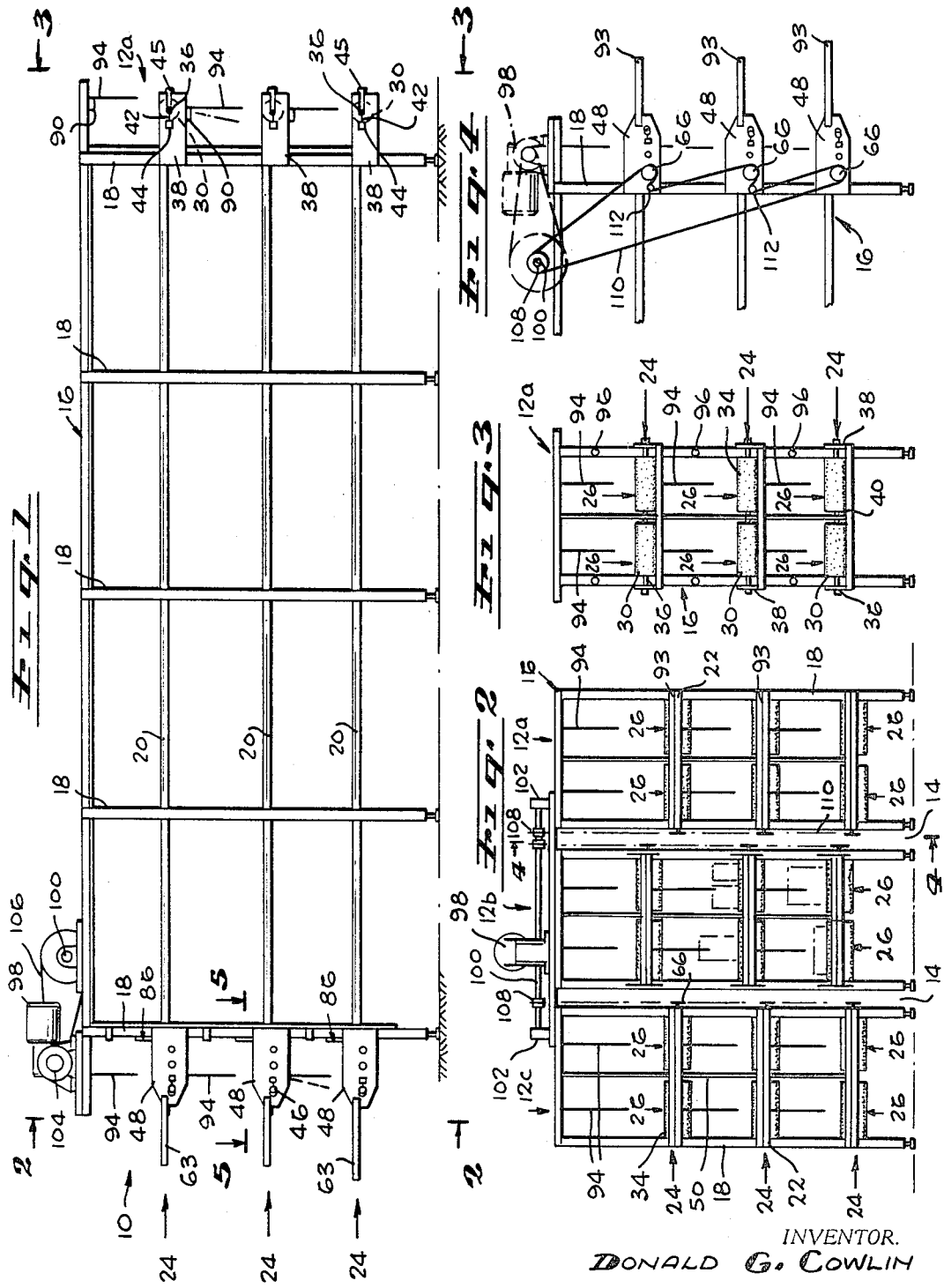

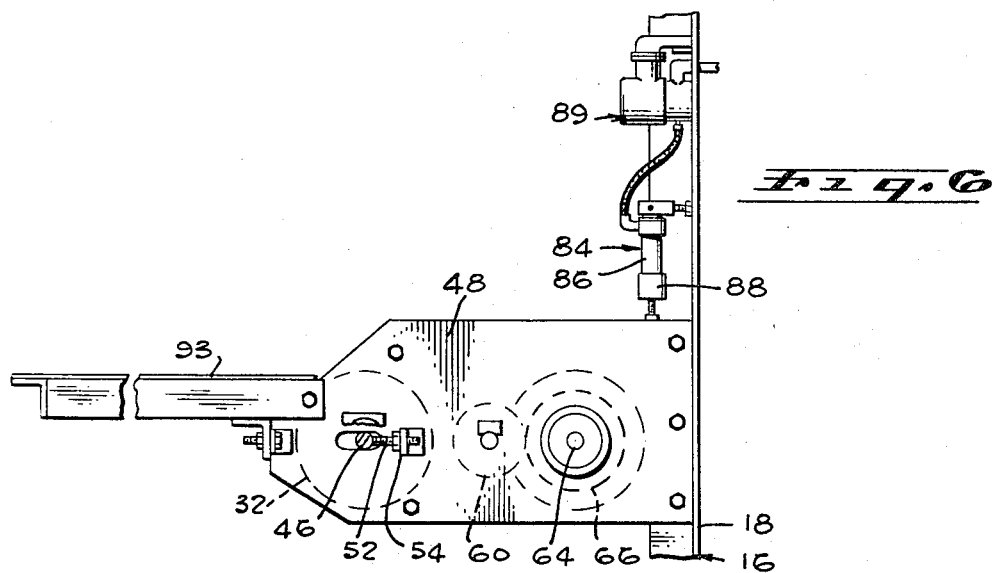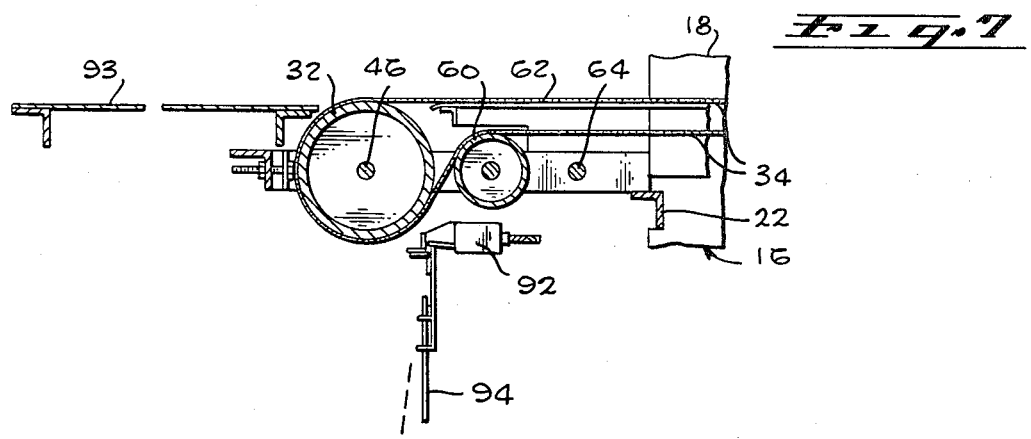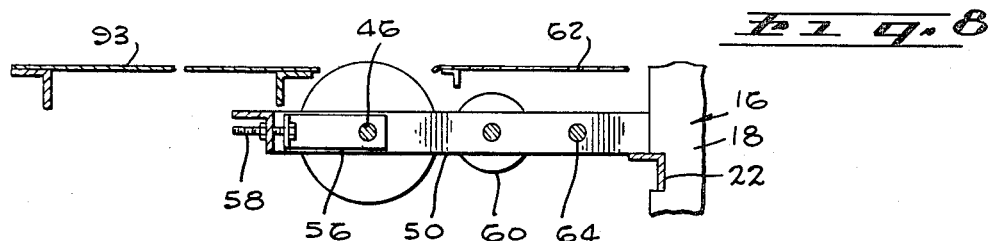

June 25, 1968    D. G. COWLIN    3,389,779
STORAGE CONVEYER
Filed Sept. 27, 1965    4 Sheets-Sheet 4
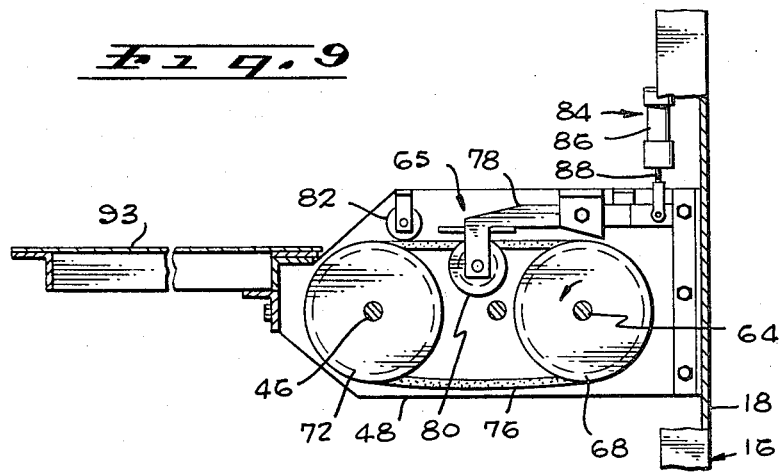
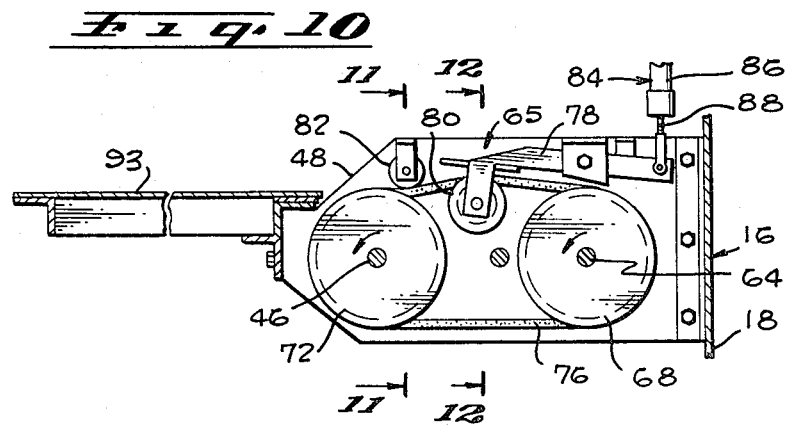
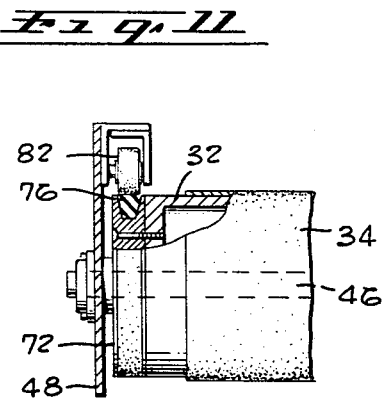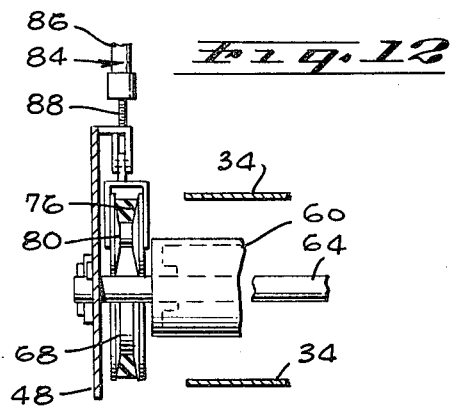
INVENTOR.
DONALD G. COWLIN
BY
Beehler & Arant
ATTORNEYS

United States Patent Office 3,389,779
Patented June 25, 1968

3,389,779
STORAGE CONVEYER
Donald G. Cowlin, 1521 Pueblo Drive,
Glendale, Calif. 91207
Filed Sept. 27, 1965, Ser. No. 490,182
11 Claims. (Cl. 198—75)

ABSTRACT OF THE DISCLOSURE

A combined article conveyer and storage apparatus having a loading end, a delivery end, and a number of generally parallel conveyers extending between said ends for storing and transporting the various articles to be handled. These conveyers are arranged in several horizontal tiers located one over the other and each containing a number of conveyers disposed side by side. Associated with the conveyers are drive means for independently driving each conveyer in a direction to move the articles thereon from the loading end to the delivery end of the apparatus. The ends of the conveyers are exposed at the loading and delivery ends, respectively, of the apparatus in such manner as to facilitate placement of the articles to be handled on the loading end of the conveyers and removal of selected articles from the delivery ends of the conveyers.

---

This invention relates generally to article handling systems and has more particular reference to a novel combined article conveyer and storage apparatus for transporting from a supply station to an assembly station a variety of articles to be selectively assembled into parcels and providing at the assembly station a continuously filled, readily accessible array of such articles from which selected articles may be quickly and easily removed for assembly into parcels.

In use, the conveyer-storage apparatus is installed in such a way that its loading end is readily accessible to a supply station where the different articles to be handled are placed on the various conveyers of the apparatus and its delivery end is readily accessible to an assembly station where the articles are assembled for parceling. Each conveyer is assigned to handle only selected articles and is normally loaded from one end to the other with such articles. Whenever the delivery end of any conveyer is emptied, that conveyer is operated to advance the following article or articles thereon to the delivery end of the apparatus and an additional article or articles are placed on the loading end of the conveyer, thereby to continuously maintain each conveyer in its fully loaded condition.

At this point, it is evident that the present conveyer-storage apparatus performs three distinct functions. First, the apparatus provides a conveyer system for transporting the articles being handled from the supply station to the assembly station. Second, the apparatus provides a storage facility of maximum storage capacity and minimum size for storing the articles until they are needed at the assembly station. Third, the apparatus provides at the assembly station a continuously filled, readily accessible array of all of the various articles from which selected articles may be quickly and easily removed for assembly into parcels.

This general organization of the apparatus constitutes one important aspect of the invention. Another important aspect of the invention is concerned with the conveyer drive means. This drive means embodies a single drive motor for all of the conveyers and novel drive coupling means between the motor and conveyers, whereby each conveyer may be operated independently of the remaining conveyers.

It is now evident that the present conveyer-storage apparatus may be employed to advantage in a variety of industries. The apparatus is particularly useful, however, in the linen supply industry in connection with sorting, storing and transporting various items of flat work and dry folded goods from the finishing department to the order department and assembling such items into parcels. For this reason, the invention will be disclosed herein primarily in connection with this particular application thereof.

Linen supply is a specialized branch of the laundry industry in which various laundered items such as towels, aprons, table linen, bed linen, garments and the like, are supplied to commercial, professional, and industrial users. The laundered items furnished by a typical linen supply plant fall into three general categories, to wit, starch work consisting of wearing apparel which is finished on garment presses, flat work consisting of items such as towels, aprons, table linen, sheets, and so on, which are finished and folded on flat work ironers, and dry folded articles consisting of bath towels and other items which are dried in drying tumblers and folded without ironing. In the great majority of linen supply plants, the major portion of items processed comprise flat work and dry folded goods.

In the linen supply industry, clean linen is delivered and soiled linen is picked up from each customer on a regularly scheduled basis. When an order from a new customer is received, an estimate is made of the linen items necessary to satisfy his requirements from one delivery to the next, and the required items are delivered to the customer. On the second delivery, the customer is furnished with the same number of items and his soiled linen is picked up. This soiled linen is returned to the linen supply plant where it is counted and itemized. Prior to the next delivery to the customer, his order is made up from the soiled linen count, the listed items being assembled from open stock, bundled, and invoiced in readiness for the next delivery.

As noted above, the major portion of the linen processed in a typical linen supply plant comprises flat work and dry folded items. These items are of many different kinds, sizes and shapes. The existing methods of handling such items in the plant are unsatisfactory because of the excessive floor space required to store the items and transport the items from the finishing department to the order department where the customers' orders are filled. Moreover, the existing methods result in much wasted time and motion of plant personnel. Thus, according to the existing linen handling methods, the finished linen goods are transferred from the finishing department to a storage area by means of floor trucks, conveyers, or the like. Upon arrival at the storage area, the finished goods are sorted and stacked on shelves or other available storage facilities. Each customer's order is then filled by selecting the appropriate items from these several stacks of finished goods. In actual practice, several different methods are employed in filling customer's orders. However, the preferred method is to assemble the requisite items in order on a conveyer belt which carries the completed orders to a checker who checks each order for errors. Thereafter, the completed orders are parceled for subsequent delivery to the customers. This method of assembling the customers' orders requires excessive floor space and involves much wasted time in walking to assemble items from different locations at one point before the order is completed. In a typical linen supply plant, the finished linen goods are stored in some thirty or more storage locations arranged along the conveyor belt and from which the various items required for each customer's order are selected.

It is evident at this point, therefore, that a definite need exists for an improved article handling system for storing and transporting the various finished linen items involved in the operation of a linen supply plant. The present invention provides a novel combined article conveyer and storge apparatus which is ideally suited to this purpose. As will appear from the ensuing description, however, the apparatus of the invention is not limited in usefulness to the linen supply industry and may be employed to advantage in any application requiring the storage of a variety of articles to be assembled for parceling, transportation of the articles from a supply station to an assembly station, and accessibility of the various articles at the assembly station to facilitate assembly of selected articles into parcels.

A general object of the invention, therefore, is to provide a novel combined article conveyer and storage apparatus of the character described.

A more specific object of the invention is to provide a combined article conveyer and storage apparatus including a number of independently operable, compactly arranged conveyers which serve the dual function of storing the articles to be handled until they are needed at the assembly station and transporting the articles from the supply station to the assembly station, and wherein further the conveyers are uniquely arranged to provide at the assembly station a continuously filled, readily accessible array of all of the different kinds of articles being handled, thereby to facilitate assembly of selected articles for parceling.

Another object of the invention is to provide a combined article conveyer and storage apparatus which is ideally suited to use in the linen supply industry in connection with sorting, storing, and transporting from the finishing department to the order department the various finished linen items required to fill customers' orders.

Yet another object of the invention is to provide a combined article conveyer and storage apparatus of the character described wherein all of the conveyers of the apparatus are powered from a common drive motor through unique drive coupling means which permit independent operation of each conveyer.

A further object of the invention is to provide a unique drive mechanism for selectively drivably coupling a number of driven members to a common driving member.

Still another object is to provide a storage conveyer which is entirely enclosed to protect the linen from dust and soiling, and in an arrangement where transportation and handling is reduced substantially to a minimum.

Other objects, advantages, and features of the invention will become evident as the description proceeds.

With these and other objects in view, the invention consists in the construction, arrangement, and combination of the various parts of the invention, whereby the objects contemplated are attained, as hereinafter set forth, pointed out in the appended claims, and illustrated in the accompanying drawings.

In the drawings:

FIGURE 1 is a side elevation of a combined article conveyer and storage apparatus according to the invention;

FIGURE 2 is an end view of the apparatus looking in the direction of the arrows on the line 2—2 in FIGURE 1;

FIGURE 3 is an end view of the opposite end of one conveyor unit embodied in the apparatus, looking in the direction of the arrows on line 3—3 in FIGURE 1;

FIGURE 4 is a section taken on line 4—4 in FIGURE 2, with motor shown in phantom lines;

FIGURE 5 is an enlarged section taken on line 5—5 in FIGURE 1;

FIGURE 6 is a view looking in the direction of the arrows on line 6—6 in FIGURE 5;

FIGURE 7 is a section taken on line 7—7 in FIGURE 5;

FIGURE 8 is a section taken on line 8—8 in FIGURE 5;

FIGURE 9 is a section taken on line 9—9 in FIGURE 5 and illustrating a clutch mechanism embodied in the apparatus in its disengaged condition;

FIGURE 10 is a view similar to FIGURE 9 illustrating the clutch mechanism in its enlarged condition;

FIGURE 11 is a section taken on line 11—11 in FIGURE 10;

FIGURE 12 is a section taken on line 12—12 in FIGURE 10; and

FIGURE 13 is a schematic diagram of a portion of an electrical-pneumatic control system embodied in the apparatus, in normal position.

The combined article conveyer and storage apparatus 10 illustrated in these drawings comprises three conveyer units 12a, 12b, and 12c arranged side by side with a narrow space 14 between each pair of adjacent units. While only three conveyer units have been shown for the sake of clarity of illustration, it will become obvious as the description proceeds that the present apparatus may embody any number of conveyer units required by the particular application for which the apparatus is to be used. For reasons which will appear presently, the right hand end of the apparatus, as the latter is viewed in FIGURE 1, will be hereinafter referred to as its loading end and the left hand end of the apparatus will be referred to as its delivery end.

The three conveyer units 12a, 12b, and 12c are substantially identical and differ only in the minor variations hereinafter noted. Accordingly, only one of the units, namely unit 12a will be described in detail.

Conveyer unit 12a comprises an elongate frame 16 including a number of spaced upright frame members, or legs, 18 rigidly joined at several levels by longitudinal frame members 20 and transverse frame members 22. Mounted on the frame 16, one over the other, are three levels or tiers 24 of horizontal conveyers 26. Each tier 24 contains a pair of laterally adjacent conveyers. Each conveyer 26 comprises a pair of rollers 30 and 32 located at the loading and delivery ends respectively, of the frame 16 and an endless conveyer member or belt 34, trained about the rollers. The two rollers 30 at the loading ends of the laterally adjacent conveyers in each tier 24 are rotatably mounted on a common shaft 36. Each shaft 36 extends through longitudinal slots in a pair of outboard support brackets 38 secured to opposite sides, respectively, of the frame 16 and a center support bracket 40 secured to the frame between the rollers. The outboard ends of each shaft 36 seat against thrust screws 42 threaded in flanges 44 projecting from the outer sides of the brackets 38. Each center support bracket 40 mounts a longitudinally slidable bearing (not shown) for the respective roller shaft, which bearing is movable endwise of the frame 16 by adjustment of a thrust screw 45. The two rollers 32 at the delivery ends of the pair of laterally adjacent conveyers 26 in each tier 24 are rotatably mounted on a common shaft 46. Each shaft 46 extends through longitudinal slots in a pair of outboard support brackets 48 secured to opposite sides, respectively, of the frame 16 and a center support bracket 50 secured to the frame between the rollers 32. The outboard ends of each shaft 46 seat against thrust screws 52 threaded in flanges 54 projecting from the outer sides of the brackets 48. Each center bracket 50 mounts a longitudinally slidable bearing 56 for the adjacent roller shaft 46, which bearing is movable lengthwise of the frame 16 by adjustment of a thrust screw 58. The several thrust screws 42, 45, 52, and 58 are adjustable to tension the conveyer belts 34.

Rotatably mounted between each outboard roller support bracket 48 and the adjacent center roller support bracket 52 is a snub roller 60. Each conveyer belt 34 is trained about its respective supporting roller 32 and the adjacent snub roller 60 in the manner best illustrated in FIGURE 7. As will appear presently the conveyer rollers 32 are driven in rotation to drive the conveyor belts 34. The snub rollers 60 are provided to increase the arc of driving contact between the belts and the rollers 32.

Mounted on the frame 16 below the upper run of each conveyer belt 34 is a bed plate 62 which may be constructed of sheet metal. Each bed plate extends substantially the full length of and slidably supports the upper run of the adjacent conveyer belt 34. Mounted on and extending endwise of the frame 16 from each pair of roller support brackets 48, at the delivery end of the frame, is a horizontal outfeed platform 63. Each outfeed platform is located substantially flush with or just slightly below the upper runs of the adjacent conveyer belts 34 and has its inner edge located in close proximity to the adjacent belts, as shown.

The pair of laterally adjacent conveyers 26 in each conveyer tier 24 are driven from a common drive shaft 64 through a pair of independently operable clutch means 65. Each drive shaft is rotatably supported in the roller support brackets 48, 50 for its respective conveyer and is located inwardly of the adjacent snub roller 60 and parallel to the adjacent conveyer rollers 32. One end of each drive shaft extends into the space 14 between the conveyer unit 12a and the adjacent conveyer unit 12b. Fixed to this extending end of each drive shaft is a sprocket 66.

The clutch means 65 for the pair of laterally adjacent conveyers 26 in each conveyer tier 24 comprise a pair of pulleys 68 and 70 fixed to the adjacent drive shaft 64 just inwardly of the corresponding outboard roller support brackets 48. Coaxially fixed to the outboard ends of the rollers 32 are pulleys 72 and 74, which are aligned with the pulleys 68 and 70 respectively, on the adjacent drive shaft 64. A drive belt 76 is loosely trained about each pair of aligned pulleys 68, 72 and 70, 74 so as to permit each drive shaft to turn freely without driving the adjacent conveyer rollers 32. The clutch means 65 for each pair of laterally adjacent conveyers 26 further comprise a pair of clutch levers 78 pivotally mounted intermediate their ends on the inner sides of the corresponding outboard support brackets 48. The outer end of each lever overlies the adjacent drive belt 76 and rotatably mounts a pulley 80 which is located below the upper run of the adjacent belt. An idler pulley 82 is rotatably mounted on the inner side of each bracket 48 over and in contact with the upper run of the adjacent belt 76, close to the adjacent conveyer roller 72.

Each clutch lever 78 is pivotally movable between the position shown in FIGURE 9 and the position shown in FIGURE 10. The lever position shown in FIGURE 9 is hereinafter referred to as the disengaged position. The lever position shown in FIGURE 10 is hereinafter referred to as the engaged position. At this point, it is evident that when any one of the clutch levers 78 occupies its disengaged position, the corresponding drive shaft 64 is permitted to turn freely without driving the adjacent conveyer roller 32. When a clutch lever is rotated to its engaged position, the pulley 80 on the lever is urged upwardly against the upper run of the adjacent drive belt 76, thereby tensioning the belt to drivably couple the adjacent drive shaft 64 and conveyer roller 32. The corresponding conveyer belt 34 is then conditioned to be driven from its respective drive shaft 64.

Mounted on the frame 16 over the inner end of each clutch lever 78 is a lever actuator 84. Each illustrated actuator comprises a pneumatic cylinder 86 containing a piston (not shown) the rod 88 of which is pivotally connected to the inner end of the adjacent clutch lever. Contained within each cylinder is a spring (not shown) which urges the corresponding piston upwardly in the cylinder and, thereby, urges the adjacent clutch lever 78 to its disengaged position of FIGURE 9. Admission of air under pressure to the upper end of each actuator cylinder 86 drives the corresponding piston downwardly in the cylinder and, thereby, rotates the adjacent clutch lever 78 to its engaged position of FIGURE 10. Each actuator cylinder is connected, through a solenoid valve 89, to a source (not shown) of air under pressure.

Mounted on the frame 16 over opposite ends, respectively, of each conveyer 26 are electrical switches 90 and 92. Each switch has a depending actuator 94 which is pivotally movable between its solid and broken line positions illustrated in the drawings. Normally, each switch actuator occupies its solid line position which position, accordingly, is hereinafter referred to as the normal position. The broken line position of each actuator is hereinafter referred to as its extended position. Each switch 90 at the loading end of the apparatus is opened in response to movement of its actuator 94 to its normal position and is closed in response to movement of the actuator to its extended position. Each switch 92 at the delivery end of the apparatus is closed in response to movement of its actuator to its normal position and is opened in response to movement of the actuator to its extended position. Mounted on the loading end of the apparatus, adjacent each conveyer 26 is a toggle switch 96.

As shown in FIGURE 13, the clutch solenoid valve 89 for each conveyer 26 is connected to an electrical power supply through the switches 90, 92, and 96 for the respective conveyor. The two switches 90, and 92 for each conveyer are connected in electrical series with the corresponding solenoid valve. The toggle switch 96 for each conveyer is connected in parallel with the corresponding valve switch 90. Each toggle switch 96 has an "on" position wherein it shunts the respective valve switch 90 and an "off" position wherein the shunt connection across the respective valve switch 90 is interrupted. It is evident at this point, therefore, that operation of each toggle switch 96 to its "off" position conditions the corresponding clutch solenoid valve 89 to be energized, and thereby admit air under pressure to the corresponding clutch actuator cylinder 86, in response to simultaneous closure of the two switches 90 and 92 for the respective valve. Operation of each toggle switch 96 to its "on" position conditions the corresponding valve to be energized, and thereby admit air under pressure to the corresponding actuator cylinder in response to closure of only the switch 92 for the respective valve.

As noted earlier, the several conveyer units 12a, 12b, and 12c, are essentially identical and differ only in certain minor variations. One of these variations resides in the fact that the conveyers 26 of the adjacent conveyer units are vertically offset or staggered, as shown in FIGURE 2. This permits the adjacent conveyer units to be placed in close proximity without interference of the laterally projecting parts of the conveyers, such as the drive shafts 64. Another difference between the conveyer units resides in the different vertical spacings between the adjacent conveyer tiers 24 of the units. This difference in spacing accommodates the conveyer units to handle linen stacks of different standard heights. A final difference between the conveyer units resides in the fact that the conveyer drive shafts 64 on the unit 12a extend beyond the left hand side of the unit as it is viewed in FIGURE 2, while the drive shafts of the two remaining units 12b and 12c extend beyond the right hand sides of the latter units.

The conveyers 26 of the several conveyer units 12a, 12b, and 12c are all powered from a common drive motor 98. Motor 98 is mounted on top of the center conveyer unit 12b. Located to the rear of the motor is a primary drive shaft 100 which extends laterally across the tops of the three conveyer units and is rotatably supported at its ends in bearings 102. Motor 98 is drivably coupled to the drive shaft 100 through a speed reducer 104 and a sprocket chain 106. Fixed to the drive shaft 100 are three sprockets 108. Each of these sprockets is associated with one of the conveyer units 12a, 12b, and 12c and is vertically aligned with the sprockets 66 on the drive shafts 64 of its respective conveyer unit. For convenience, these latter drive shafts are hereinafter referred to as secondary drive shafts. The aligned sprockets 66 and 108 on the primary and secondary drive shafts are interconnected by sprocket chains 110 which are trained about these sprockets, and additional idler sprockets 112 on the conveyer units, in the manner illustrated in FIGURE 4. Accordingly, motor 98 is conditioned to drive all of the conveyers 26 in the same direction. The motor is energized in a direction to effect movement of the upper runs of the conveyer belts 34 toward the delivery end of the apparatus.

In use, the illustrated conveyer and storage apparatus 10 is installed in a lenen supply plant with the loading end of the apparatus located at the finishing department and the delivery end of the apparatus located at the order department. Each conveyer is assigned to handle particular finished items, such as towels, or sheets, or garments, for example, which are stacked on the conveyer in the manner illustrated in broken lines in FIGURE 2. When initially loading the apparatus with the various finished items to be handled, the toggle switches 96 for all of the conveyers 26 are set in their "off" position so that each conveyer remains stationary until the actuator 94 for its respective loading end valve switch 90 is moved to its extended position. When loading a stack of finished linen items onto their respective conveyer 26, the stack is slid endwise onto the loading end of the conveyer in such a way that the stack engages the adjacent switch actuator 94 and moves the latter to its extended position. This extension of the acutator closes the corresponding switch 90 thereby energizing the clutch solenoid valve 89 and engaging the clutch 65 for the respective conveyer. The conveyer is then driven by the motor 98 until the stack of linen is advanced toward the delivery end of the apparatus to a position wherein the stack clears the actuator. The actuator then returns to its normal position and the conveyer stops. This action is repeated for each of the conveyers until the leading linen stack on each conveyer finally arrives at the delivery end of the apparatus and moves the actuator 94 for the corresponding delivery end valve switch 92 to its extended position. This opens the latter switch and thereby inactivates the corresponding clutch solenoid valve 89. Each conveyer will then remain stationary even though its respective loading end switch 90 is closed. The several toggle switches 96 are now set in their "on" positions, thereby inactivating the several loading end valve switches 90.

The apparatus 10 is now conditioned for operation. In this condition, each conveyer 26 is loaded from end to end with stacks of its respective finished linen items. The leading stacks at the delivery ends of the conveyers are located adjacent the outfeed platforms 63.

When filling customers' orders, the leading stack of linen on each conveyer is slid forwardly onto the adjacent outfeed platform 63. When a stack of linen items is thus moved from the delivery end of a conveyer onto the adjacent platform 63 the actuator 94 for the corresponding delivery end valve switch 92 is released to return to its normal position. This effects immediate engagement of the clutch 65 for the conveyer, which is then driven to advance the next linen stack on the conveyer to the delivery end of the apparatus. When filling customers' orders, the order clerk selects the required items from the linen stacks positioned on the outfeed platform 63. When the stack on any platform is depleted the next stack on the corresponding conveyer 26 is moved forwardly onto the platform, thereby initiating automatic operation of the conveyer to advance the next linen stack thereon to the delivery end of the conveyer. In the event that an order calls for a number of items exceeding the number of items in one stack, the above process is repeated until the required number of items are obtained. It is evident, therefore, that the delivery end of the apparatus 10 provides, at the order department, a readily accessible continuously filled array of all of the various finished items of linen on the apparatus from which selected items may be quickly and easily removed as needed to fill customers' orders. Normally, when ever a stack of liner items is removed from the delivery end of a conveyor 26, an additional stack of the same items is placed on the loading end of the conveyer, thereby to constantly maintain each conveyer in its fully loaded condition. Each conveyer, then, serves as a storage facility for storing its respective items until they are needed to fill customers' orders. If a conveyer it not maintained in its fully loaded condition, of course, a gap will exist between at least two adjacent linen stacks on the conveyer. It is evident, however, that under these conditions, when the leading stack is removed from the delivery end of the conveyer, the latter will be automatically continuously advanced until the following stack arrives at the delivery end of the apparatus.

It is now apparent that the present combined article conveyer and storage apparatus is ideally suited for use in handling finished linen in linen supply plants. It is further apparent, however, that the apparatus of the invention is not limited in usefulness to the linen supply industry, and may be used in other applications requiring the storage of a variety of items to be parceled and the transfer of such items from a supply station, where the items are placed on the apparatus, to an assembly station where the items are selectively assembled for parceling.

While a presently preferred embodiment of the invention has been disclosed for illustrative purposes, various modifications in the design, arrangement of parts, and instrumentalities of the invention are obviously possible within the spirit and scope of the following claims.

What is claimed as new in support of Letters Patent is:

1. A combined conveyer and storage apparatus for transporting from a supply station to an assembly station a variety of articles to be assembled for parceling and providing at said assembly station a readily accessible, continuously filled array of such articles from which selected articles may be quickly and easily removed, said apparatus comprising:

an elongate frame structure having a loading end to be located at said supply station and a delivery end to be located at said assembly station, a number of conveyers mounted on and extending endwise of said frame structure, said conveyers being arranged in several horizontal tiers disposed one above the other and each containing a number of laterally adjacent conveyers disposed in side by side relation, each conveyer comprising a pair of rollers rotatably mounted on said ends, respectively, of said frame structure and an endless conveyer belt trained about said rollers, a number of secondary drive shafts rotatably mounted on one end of said frame structure at the levels of said tiers, respectively, each drive shaft extending parallel to and being disposed adjacent a pair of conveyer rollers at said one end of said structure, a primary drive shaft rotatably mounted on said one end of said frame structure and extending substantially the full width of said structure, means for driving said primary shaft in rotation, means drivably coupling said primary shaft to each of said secondary shafts, and means including selectively operable clutch means drivably coupling each secondary shaft to its adjacent conveyer rollers in such manner as to permit said conveyers to be independently driven from said primary shaft.

2. Apparatus according to claim 1 wherein:

said frame structure comprises a number of separate frames each having several of said conveyer tiers, said frames being disposed in side by side, laterally spaced relation, said secondary shafts having projecting ends, respectively, extending into the spaces between adjacent frames, and said first mentioned drive coupling means being disposed in said spaces and operably connected between said primary shaft and said extending ends of said secondary shafts, respectively.

3. A combined conveyor and storage apparatus for transporting from a supply station to an assembly station a variety of articles to be assembled for parceling and providing at said assembly station a readily accessible, continuously filled array of such articles from which selected articles may be quickly and easily removed, said apparatus comprising:

a plurality of conveyor units disposed in side by side laterally spaced relation and having loading ends to be located at said supply station and delivery ends to be located at said assembly station, each conveyor unit including an elongate frame, a number of conveyers mounted on and extending lengthwise of said frame, said conveyers being arranged in several horizontal tiers disposed one over the other and each containing a pair of laterally adjacent conveyers, each conveyer comprising a pair of rollers rotatably supported on the ends, respectively, of said frame and an endless conveyer belt trained about said rollers, the adjacent rollers in each tier being approximately coaxially aligned, a secondary drive shaft rotatably supported on one end of said frame at the level of each said tier, each drive shaft extending parallel to the adjacent conveyer rollers in the respective tier, means including selectively operable clutch means drivably coupling each drive shaft to each of its adjacent conveyer rollers, whereby the conveyers in each said tier may be independently operated from the adjacent drive shaft, a primary drive shaft extending across and substantially the full width of the several conveyer units parallel to said secondary drive shafts, means for driving said primary shaft in rotation, and means drivably coupling said primary shaft to each of said secondary shafts.

4. A dual conveyer system comprising:

an elongate frame, a pair of conveyers disposed side by side on and extending lengthwise of said frame, said conveyers including a pair of first generally coaxial, axially spaced rollers on one end of said frame, a pair of second generally coaxial, axially spaced rollers on the other end of said frame, and a pair of endless conveyor members each trained about one of said first rollers and one of said second rollers, a rotary drive shaft on said one end of said frame adjacent and parallel to said first rollers, means for driving said shaft in rotation, a pair of driven pulleys coaxially fixed to said first rollers, respectively, a pair of driving pulleys fixed to said driving shaft, each of said driving pulleys being aligned with a driven pulley, a drive belt loosely trained about each of said driving pulleys and its aligned driven pulley, thereby to permit rotation of said drive shaft independently of said rollers, and means for selectively and independently tensioning each of said belts to drivably couple the respective roller to said drive shaft.

5. A conveyer system according to claim 4 wherein: said belt tensioning means for each drive belt comprises a lever pivoted on said frame adjacent the respective belt, means on said lever engageable with the respective belt to tension the latter upon pivotal movement of said lever in one direction, and means for pivoting said lever in each direction of pivotal movement thereof.

6. A dual conveyer system, comprising:

an elongate frame, a first shaft mounted on one end of said frame, a second shaft mounted on the other end of said frame parallel to said first shaft, a pair of first axially spaced rollers rotatably mounted on said first shaft, a pair of second axially spaced rollers rotatably mounted on said second shaft, a pair of conveyer belts each trained about one of said first rollers and one of said second rollers, a drive shaft rotatably mounted on said one end of said frame adjacent and parallel to said first shaft, a driven pulley coaxially fixed to each of said first rollers, a pair of driving pulleys fixed to said driving shaft, each driving pulley being aligned with a driven pulley, a belt loosely trained about each driving pulley and its alinged driven pulley thereby to permit rotation of said driving shaft independently of said first rollers, and means for selectively independently tensioning each belt.

7. A multiple conveyer system comprising:

an elongate frame, a number of conveyers mounted on and extending endwise of said frame, said conveyers being arranged in several horizontal tiers disposed one over the other and each containing a pair of laterally adjacent conveyers, each conveyer comprising a pair of rollers rotatably mounted on the ends, respectively, of said frame and an endless conveyer belt trained about said rollers, the pair of rollers in each tier at each end of said frame being approximately coaxially aligned, rotary drive shafts mounted on one end of said frame at the levels of said tiers, respectively, each drive shaft extending parallel to the adjacent pair of conveyer rollers, means for selectively and independently drivably coupling each drive shaft to its adjacent rollers, a motor mounted on said frame, and means drivably coupling said motor to each of said drive shafts.

8. A conveyer system according to claim 7 wherein:

said drive coupling means between each drive shaft and its adjacent conveyer roller pair comprises a pair of driving pulleys fixed to the respective driving shaft, a pair of driven pulleys coaxially fixed to the adjacent conveyer rollers, respectively, each driving pulley being aligned with a driven pulley, a drive belt loosely trained about each driving pulley and its aligned driven pulley thereby to permit rotation of the driving shaft independently of the adjacent rollers, and means for selectively tensioning each belt.

9. A multiple conveyer system comprising:

an elongate frame, a number of conveyers mounted on and extending endwise of said frame, said conveyers being arranged in several horizontal tiers disposed one over the other and each containing a pair of laterally adjacent conveyers, each conveyer pair comprising a first shaft at one end of said frame, a second shaft at the other end of said frame parallel to said first shaft, a first pair of axially spaced rollers rotatably mounted on said first shaft, a second pair of axially spaced rollers rotatably mounted on said second shaft, and a pair of endless conveyer belts each trained about one of said first rollers and one of said second rollers, a number of drive shafts rotatably mounted on said one end of said frame at the levels of said tiers, respectively, each drive shaft extending parallel to the adjacent pair of conveyer rollers in the respective tier, a driven pulley coaxially fixed to each first roller, a pair of driving pulleys coaxially fixed to each drive shaft, each driving pulley being aligned with an adjacent driven pulley, a drive belt loosely trained about each driving pulley and its aligned driven pulley, thereby to permit rotation of each of said driving shafts independently of the respective adjacent first rollers, means for selectively and independently tensioning each belt, thereby to drivably couple the respective first roller to the adjacent drive shaft, said drive shafts having one end projecting beyond one side of said frame, a motor mounted on said frame, and means drivably coupling said motor to said extending ends of said drive shafts.

10. A combined conveyer and storage apparatus for transporting from a supply station to an assembly station a variety of articles to be assembled for parcelling and providing at said assembly station a readily accessible, continuously filled array of such articles from which selected articles may be quickly and easily removed, said apparatus comprising:

an elongate frame structure having a length greater than its breadth and having a loading end to be located at said supply station and a delivery end to be located at said assembly station, a number of conveyers mounted on and extending from said loading end to said delivery end endwise of said frame structure, each of said conveyers extending from said loading end to said delivery end, means for selectively and independently driving said conveyers in a direction to transport articles on said conveyers from said loading end to said delivery end of said frame structure, said driving means comprising a selectively operable driving mechanism for each conveyer, first and second switches mounted on said frame structure at the loading and delivery ends, respectively, of each conveyer in position wherein each switch is disposed to be actuated from a normal position to a second position by articles on the respective conveyer, means operatively connecting the pair of switches associated with each conveyer to the respective drive mechanism in such manner as to condition the corresponding mechanism for driving the respective conveyer when said first switch of the respective switch pair occupies said second position and said second switch of the respective switch pair occupies said normal position and inactivate the corresponding drive mechanism when either switch of the respective switch pair occupies its other position, and means for selectively inactivating said first switch of said switch pair in such manner that the corresponding drive mechanism is conditioned to drive the respective conveyer when said second switch of the respective pair occupies its normal position and inactivated when the latter switch occupies its second position, and the ends of said conveyers being exposed at the ends, respectively, of said frame structure to permit said articles to be readily placed on the loading ends of said conveyers and readily removed from the delivery ends of said conveyers.

11. A combined conveyer and storage apparatus for transporting from a supply station to an assembly station a variety of articles to be assembled for parcelling and providing at said assembly station a readily accessible, continuously filled array of such articles from which selected articles may be quickly and easily removed, said apparatus comprising:

an elongate frame structure having a length greater than its breadth and having a loading end to be located at said supply station and a delivery end to be located at said assembly station, a number of conveyers mounted on and extending from said loading end to said delivery end endwise of said frame structure, each of said conveyers extending from said loading end to said delivery end, means for selectively and independently driving said conveyers in a direction to transport articles on said conveyers from said loading end to said delivery end of said frame structure, said driving means comprising a selectively operable drive mechanism for each conveyer, a first switch mounted on said frame structure at the loading end of each conveyer in position wherein each said first switch is disposed to be actuated from a normal position to a second position by articles on the respective conveyer, and means operatively connecting each first switch to the corresponding drive mechanism in such manner as to condition the corresponding mechanism for driving the respective conveyer when the first switch occupies its second position and inactivate the corresponding mechanism to stop the conveyer when the first switch occupies its normal position, a second switch mounted on said frame structure at the delivery end of each conveyer in a position to be actuated from a normal position to a second position by articles on the respective conveyer, and means operatively connecting each second switch to the corresponding drive mechanism in such manner as to condition the corresponding mechanism for driving the respective conveyer when the respective second switch occupies its normal position and inactivate the corresponding mechanism to stop the respective conveyer when the respective second switch occupies its second position, and the ends of said conveyers being exposed at the ends, respectively, of said frame structure to permit said articles to be readily placed on the loading ends of said conveyers and readily removed from the delivery ends of said conveyers.

References Cited

UNITED STATES PATENTS

| | | | |
|---|---|---|---|
| 434,582 | 8/1890 | Corning | 214—16.4 |
| 1,355,488 | 10/1920 | McKenney | 198—37 X |
| 1,579,994 | 4/1926 | Atkinson | 198—75 X |
| 1,697,220 | 1/1929 | Anstiss | 198—37 X |
| 2,536,756 | 1/1951 | Lopez | 198—20 X |
| 2,705,570 | 9/1955 | Maissian | 214—16 |
| 3,272,307 | 9/1966 | Waite | 214—16.4 X |

EDWARD A. SROKA, *Primary Examiner.*

EVON C. BLUNK, *Examiner.*

A. C. HODGSON, *Assistant Examiner.*